U nited States Patent [19]  
Goossens

[11] 4,230,769  
[45] Oct. 28, 1980

[54] GLASS-POLYCARBONATE LAMINATE

[75] Inventor: John C. Goossens, Mt. Vernon, Ind.

[73] Assignee: General Electric Company, Pittsfield, Mass.

[21] Appl. No.: 7,039

[22] Filed: Jan. 29, 1979

[51] Int. Cl.$^2$ .................... B32B 17/10; B32B 27/08
[52] U.S. Cl. ........................ 428/412; 156/99; 156/106; 156/329; 428/414; 428/429; 428/447; 428/451
[58] Field of Search .............. 428/412, 414, 429, 447, 428/451; 156/99, 106, 329

[56] References Cited

U.S. PATENT DOCUMENTS

| | | | |
|---|---|---|---|
| 3,030,234 | 4/1962 | McClinton | 428/447 X |
| 3,634,186 | 1/1972 | Bostick et al. | 428/412 |
| 3,650,808 | 3/1972 | Gagnon | 428/412 |
| 4,027,072 | 5/1977 | Molari | 428/412 |
| 4,040,882 | 8/1977 | LeGrand | 428/412 X |
| 4,087,585 | 5/1978 | Schulz | 428/429 |

*Primary Examiner*—Harold Ansher
*Attorney, Agent, or Firm*—William F. Mufatti

[57] ABSTRACT

A glass-polycarbonate resin laminate wherein a glass layer is bonded to a polycarbonate resin layer by means of a bonding system comprised of (i) a first adhesion promoting primer layer disposed on said glass layer and containing the reaction product of water, an alkanol, an aminoalkyl polyalkoxysilane and an alkyl carbonate; (ii) a second adhesion promoting primer layer disposed on said first primer layer containing an organopolysiloxane-polycarbonate block copolymer and an epoxy resin; and (iii) an organopolysiloxane-polycarbonate copolymer bonding layer disposed between said second primer layer and the polycarbonate resin layer.

12 Claims, No Drawings

GLASS-POLYCARBONATE LAMINATE

The present invention relates to glass-polycarbonate resin laminates. More particularly, it relates to such laminates which include a bonding or adhesive layer containing an organopolysiloxane-polycarbonate copolymer between the glass layer and the polycarbonate layer and two adhesion promoting primer layers between the adhesive organopolysiloxane-polycarbonate copolymer layer and the glass layer. The first primer layer is disposed adjacent the glass layer and contains the reaction product of water, an alkanol, an aminoalkyl polyalkoxysilane, and an alkyl carbonate while the second primer layer is disposed between said first primer layer and said adhesive organopolysiloxane-polycarbonate copolymer layer and contains an epoxy resin and an organopolysiloxane-polycarbonate block copolymer.

BACKGROUND OF THE INVENTION

The use of so-called safety glazing or penetration resistant glazing for windows, windshields and the like utilizing polycarbonate resin layers as a structural component is well known. For example, glass polycarbonate resin laminates are described in U.S. Pat. No. 3,666,614, the glass and polycarbonate being cohered together using an ethylene-vinyl acetate copolymer. In U.S. Pat. No. 3,520,768, there are described laminates of relatively thick glass having a comparatively thin polycarbonate foil as the cohering material. It is also known to utilize certain polysiloxane-polycarbonate copolymers such as described in U.S. Pat. Nos. 3,832,419; 3,189,662; and 3,321,325 as the adhesive interlayers between a glass substrate and another substrate, such as a glass or a thermoplastic sheet, to provide for a reinforced laminate structure. Although the utility of such organosilicon-polycarbonate block copolymers provided for a variety of useful applications in the reinforced laminate area, one of the problems which developed was that the bond strength between the organosilicon-polycarbonate copolymer and the glass substrate was often insufficient for particular uses. Subsequently, primer compositions were developed to achieve improved bond strength between the glass substrate and the organosilicon-polycarbonate copolymer. One such primer composition, as described in U.S. Pat. No. 4,040,882, assigned to the same assignee as the present invention, was in the form of an aqueous-alcoholic reaction product of an aminoalkyl polyalkoxysilane and an alkyl carbonate.

While valuable results were achieved by the use of these primer compositions, the use of the two primer systems of the present invention provides laminates having greater bond strength between the glass substrate and the organosilicon-polycarbonate copolymer, especially under conditions of high moisture levels, than previously obtainable.

DESCRIPTION OF THE INVENTION

The instant invention comprises a glass-polycarbonate resin laminate wherein the glass layer is bonded to the polycarbonate layer by an organopolysiloxane-polycarbonate block copolymer adhesive interlayer and wherein the glass is primed with two primer layers. The first of these primer layers is disposed directly on the face of the glass layer that is to contact the organopolysiloxane-polycarbonate block copolymer and comprises an aqueous-alcoholic reaction product of an aminoalkyl polyalkoxysilane and an alkyl carbonate. The second primer layer is disposed on said first primer layer and contains an epoxy resin and an organopolysiloxane-polycarbonate block copolymer.

Any polycarbonate resin can be used in the laminate of the present invention including but not limited to those described in U.S Pat. Nos. 3,161,615; 3,220,973; 3,312,659, 31312,660; 3,313,777; 3,666,614; 3,989,672, among others, all of which are incorporated herein by reference. Generally, a carbonate polymer used in the instant laminates is an aromatic carbonate polymer having recurring units of the formula:

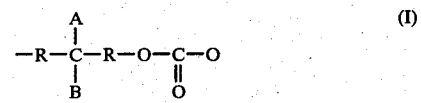

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

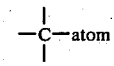

form a cycloalkane radical, the total number of carbon atoms in A and B being up to 12.

Also included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

Exemplary polycarbonate resins are those derived from the reaction of bisphenol-A and phosgene. These polycarbonates have from 10–400 recurring units of the formula:

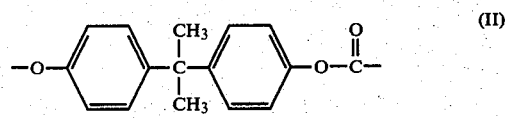

Any of the usual types of glass used in so-called safety applications can be used in conjunction with the present invention including coated or uncoated and chemically and thermally strengthened or tempered glass as well as common untempered glass where indicated.

An example of the chemically tempered glass is that which has been treated chemically with salts in an ion-exchange type process to give higher tensile and flexural strength glass. A glass treating process of this type is disclosed in U.S. Pat. No. 3,395,998. Tempered glasses are available commercially and are sold by companies such as Pittsburgh Plate Glass Company of Pittsburgh, PA, and Corning Glass Works of Elmira, NY.

The polysiloxane-polycarbonate block copolymers are known compounds which are described in U.S. Pat. Nos. 3,189,662; 3,821,325; and 3,832,419, all of which are incorporated herein by reference.

These polysiloxane-polycarbonate block copolymers can be expressed by the average formula (III)

umits of a polydiorganosiloxsane joined by substituted arloxy-silicon linkages to a polyester of dihydric phenol

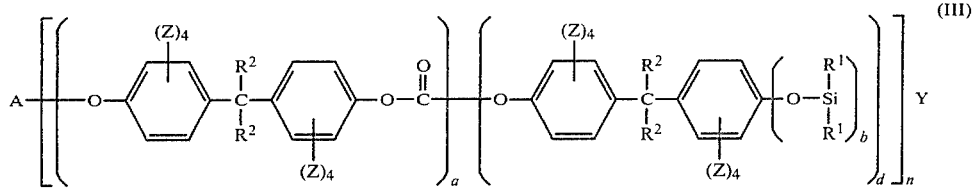

wherein n is at least 1, and preferably n is an integer equal to from 1 to about 1000, inclusive; a is equal to from 1 to about 200, inclusive; b is equal to from about 5 to about 200, inclusive; and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive; and d is 1 or more; Y is

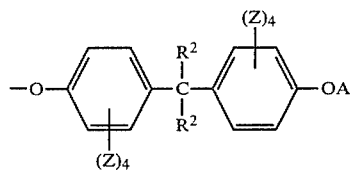

A is a member selected from the class of hydrogen and

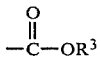

$R^2$ is a member selected from the class of hydrogen, monovalent hydrocarbon radicals and halogenated monovalent hydrocarbon radicals, $R^1$ is a member selected from the class of monovalent hydrocarbon radicals, halogenated monovalent hydrocarbon radicals and cyanoalkyl radicals, $R^3$ is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by $R^2$ of Formula III are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, $R^1$ includes all radicals included by $R^2$ above except hydrogen, where $R^2$ can also be all the same radical or any two or more of the aforementioned $R^2$ radicals except hydrogen, and $R^1$ is preferably methyl. $R^1$ also includes, in addition to all the radicals included by $R^2$, except hydrogen, cyanoalkyl radicals such as cyanoethyl, cyanobutyl, etc., radicals. Radicals that are included within the definition of Z of Formula III are hydrogen, methyl, ethyl, propyl, chloro, bromo, iodo, etc., and combinations thereof, and Z is preferably hydrogen.

The block copolymers of the present invention can be further described as comprising recurring copolymeric units of a polydiorganosiloxsane joined by substituted arloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The copolymers of Formula III can be produced by reacting at temperatures in the range of 0° C. to 100° C., preferably 20° C. to 50° C., and in the presence of an acid acceptor, a mixture of a halogen chain-stopped polydiorganosiloxane having the formula

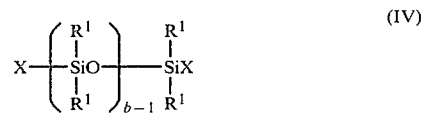

and a dihydric phenol having the formula

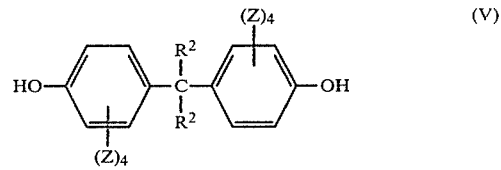

and thereafter phosgenating said reaction product until the resulting copolymer achieves a maximum intrinsic viscosity, where $R^1$, $R^2$, Z and b are as defined above, and X is a halogen radical, preferably chloro.

The halogen chain-stopped polydiorganosiloxanes of Formula IV can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 3,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally, it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula V are, for example, 2,2-bis(4-hydroxyphenyl)propane (bisphenol-A); 2,4'-dihydroxydiphenylmethane; bis-(2-hydroxyphenyl)methane; bis-(4-hydroxyphenyl)methane; 1,1-bis-(4-hydroxyphenyl)ethane; 1,1-bis-(4- hydroxy-2-chlorophenyl)ethane; 1,1-bis-(2,5-dimethyl-4-hydroxyphenyl)ethane; 2,2-bis-(3-isopropyl-4-hydroxyphenyl)propane, etc. Mixtures can also be used. Others will occur to those skilled in the art.

The organopolysiloxane-polycarbonate copolymers essentially comprise recurring units consisting of a polydiorganosiloxane interconnected by substituted aryloxy-silicon linkages to a polyester of carbonic acid precursor and a dihydric phenol.

These organopolysiloxane-polycarbonate block copolymers can be used either alone as such or in conjunction with well known modifiers to provide particular desired characteristics.

Illustrative of the above block copolymers is General Electric LR-3320. This material has a specific gravity of 1.12, a tensile strength of 2500 to 3900 psi, an elongation of 230 to 430, a tear strength (Die C) of 400 lbs./in., and a brittleness temperature below −76° F. and a heat deflection temperature (10 mils under 66 psi Load) of 160° F.

The preferred manner of employing the organopolysiloxane-polycarbonate block copolymer adhesives of the present invention is in the form of film or sheets of about 5 to about 90 mils in thickness, and preferably of about 10 to about 50 mils in thickness.

The first primer layer contains the reaction product of water, an alkanol, an alkyl carbonate and an aminoalkyl polyalkoxysilane. Such a primer is described in U.S. Pat. No. 4,040,882, assigned to the same assignee as the instant invention, which is incorporated herein by reference.

Basically, this primer is in the form of the equilibrated product at temperatures in the range of between 5° C. to 50° C. of (a) water, (b) a $C_{(1-8)}$ alkanol, and (c) the reaction mixture at temperatures in the range of between 0° C. to 90° C. of 1 to 3 moles of an aminoalkyl polyalkoxysilane per mole of a difunctional organic compound selected from the class consisting of diorganocarbonates, where there is employed in such equilibrated reaction product on a volume basis, from 0.5 to 10 parts of (a), and from 0.5 to 10 parts of (c) per 100 of (b).

Included by the above described $C_{(1-8)}$ alkanols which can be employed in the primer composition are, for example, methanol, ethanol, propanol, butanol, etc. Among the difunctional organic compounds are preferably dialkyl carbonates which include, for example, dimethyl carbonate, diethyl carbonate, dipropyl carbonate, etc. However, diaryl carbonates, such as diphenyl carbonate, can be used. Preferably, the aminoalkyl polyalkoxysilane which is used is gamma-aminopropyl triethoxy silane. However, other alkyl polyalkoxysilanes can be used, such as gamma-aminopropyl trimethoxy silane, N,beta-(aminoethyl)-gamma-aminopropyl trimethoxy silane, etc.

In making the above described primer composition, a mixture of the aminoalkyl polyalkoxysilane and the dialkylcarbonate can be made and agitated and allowed to stand at room temperature for about 0.5 to 24 hours. The alkanol then can be combined with the resulting reaction product. Water than can be added to a solution of the above-described reaction product of the dialkylcarbonate and the aminoalkyl polyalkoxysilane in alcohol. After the water has been added, the mixture is stirred and the resulting mixture is allowed to stand for 18 to 24 hours or more to achieve an equilibrium condition. Although it is not completely understood what reactions take place in the formation of the primer composition of the present invention, one explanation is that a urethane, or a urea can be formed during the initial period of contacting and mixing the aminoalkyl polyalkoxysilane and the dialkylcarbonate. A further explanation of the primer performance is that when water is added to the aforementioned reaction product along with the alcohol, that reactive silanol intermediates are formed which also achieve an equilibrium condition after the mixture is allowed to stand for an extended period of time.

In addition to the dialkylcarbonates, there also can be employed in the practice of the present invention compounds, such as acid halides, esters, and anhydrides of carboxylic acids, such as acetyl chloride, methyl acetate, and acetic anhydride which can be used in combination with a sufficient amount of acid acceptor to combine with any byproduct acid formed during the initial contact between the aminoalkyl polyalkoxysilane and the carboxylic acid derivative.

The second primer layer consists of the aforedescribed polysiloxane-polycarbonate block copolymer and an epoxy resin.

The term "epoxy resin" as utilized in the description of the primer compositions of the present invention includes any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phneolformaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methyacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Ganger, J. Am. Chem. Soc. 81 632–5 (1959). As described in the literature, epoxy resins can also be modified in a number of standard ways such as reactions with amines, carboxylic acids, thiols, phenols, alcohols, etc. as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the Encyclopedia of Polymer Science and Technology, Vol. 6, 1967, Interscience Publishers, New York, pp. 209–271, and Modern Plastics Encyclopedia, Vol. 53, No. 1014, 1976–1977, McGraw-Hill Inc., New York, pp. 22–24.

Generally, the second primer contains from about 85 to 99% by weight of the polysiloxane-polycarbonate block copolymer and from about 1 to about 15% by weight of the epoxy resin, preferably from about 90 to about 99% by weight of the polysiloxane-polycarbonate block copolymer and from about 1 to about 10 percent by weight of the epoxy resin, and, more preferably, from about 93 to about 97% by weight of the block copolymer and from about 3 to about 7% by weight of the epoxy resin. Generally, if less than about 1 weight percent epoxy resin is present in the second primer layer, there is no appreciable increase in the bond strength between the glass layer and the polysiloxane-polycarbonate copolymer interlayer. If too much epoxy resin is present in the second primer layer, i.e., an amount greater than about 20 weight percent, there is an actual decrease in the bond strength between the glass layer and the polysiloxane-polycarbonate interlayer.

In the practice of the present invention, the first primer layer is applied onto the glass layer from a water-alkanol solution. The glass is then air dried in order to evaporate off a substantial portion of the water and alkanol from the first primer composition. This concentrated first primer compoistion is then thermally cured, generally at between about 40° to 80° C. for a period of time generally ranging from about 10 to about 50 minutes. The thickness of the first primer layer, while not critical, generally ranges from about 0.0005 to about 0.01 mils.

The second primer is then applied onto said first primer layer from a solution containing methylene chloride solvent, epoxy resin and the organopolysiloxane-polycarbonate block copolymer. After this solution has been applied onto the glass primed with the first primer layer, the glass is air dried to evaporate off a substantial portion of the methylene chloride solvent. The glass containing said first primer layer and the second primer layer is then heated to about 180° C. for about 1 hour to cure said second primer layer. The thickness of this second primer layer, while not critical, generally ranges from about 0.1 to about 10 mils, preferably from about 1 to about 5 mils. Application of both the first and second primer solutions to the glass substrate can be achieved by the use of the various means, such as a roller coater, a curtain coater, painting, spraying, dip coating and the like.

A sheet of the organopolysiloxane-polycarbonate block copolymer, generally having a thickness from about 15 to about 50 mils is then placed on the primed glass and a polycarbonate layer is then placed on the organopolysiloxane-polycarbonate block copoymer interlayer. This assembly can then be heated to a temperature of from 120° C. to 150° C., while applying a pressure of from 15 psi to 200 psi to form the laminate of the present invention.

The laminates of the present invention may consist of a glass ply bonded by means of the instant primers and adhesive to a polycarbonate ply, or they may consist of two outer glass plies bonded by means of the instant primers and adhesive to a core polycarbonate ply. In the embodiment wherein the laminate consists of a single glass ply bonded to a polycarbonate ply, it is sometimes desirable to provide the outer surface of the polycarbonate, i.e.g, the surface opposite the glass ply, with an abrasion resistant coating. This is due to the fact that polycarbonate resins are relatively soft materials which are readily scratched and abraded. Therefore, in some applications, where the polycarbonate lamina is subject to being abraded, it is desirable to provide the exposed polycarbonate lamina with a tough and hard abrasion and mar resistant coating. In general, such mar-resistant coatings, which are well known, can be metal oxides; modified melamines; ultraviolet hardenable organics such as acrylated monomers or mixtures of these monomers with acrylate-modified polymeric resins; inorganic glasses such as silica or alumina; polyurethanes; silicone resins; silicone resins with recurring organic groups such as polymethyl methacrylate; silica, such as colloidal silica, filled silicone resins; silicone resins derived from epoxy terminated silanes; polyamide ester resins; and, ion-beam deposited carbon, among others, are harder and relatively more scratch and abrasion resistant than the underlying polycarbonate layer which they protect.

These abrasion resistant coatings can be bonded to the polycarbonate lamina during the lamination of the glass lamina to the polycarbonate lamina or they can be applied to the polycarbonate lamina prior to or subsequent to such lamination.

DESCRIPTION OF THE PREFERRED EMBODIMENT

In order to more fully and clearly illustrate the present invention, the following specific examples are presented. It is intended that the examples be considered illustrative rather than limiting the invention disclosed and claimed herein. In the example, all parts and percentages are on a weight basis unless otherwise specified.

EXAMPLE 1

A solution is prepared consisting of one mole of dimethylcarbonate and 1.1 mole of gamma-aminopropyl triethoxysilane. This solution is stirred for 30 minutes and then allowed to stand for 3 days. Based on the method of preparation, the resulting mixture is the reaction product of dimethylcarbonate and the gamma-aminopropyl triethyoxy silane.

A mixture of 50 parts of the above urea reaction product and 1000 parts of methanol is stirred thoroughly. There is then added to this mixture about 10 parts of water to produce a solution which is also thoroughly stirred. There is obtained a solution which is allowed to stand for 24 hours. Based on the method of preparation, the mixture is a silanol-containing reaction product of water, methanol and the above urea-containing reaction product.

A clear 125 mil thick glass panel is coated with the above primer solution. The coated glass panel is air dried for 10 minutes and then heated in an oven for 15 minutes at 50° C. The resulting primer layer is about 0.0016 mil thick.

EXAMPLE 2

A mixture is prepared consisting of 1340 grams of methylene chloride, 236 grams of the aforedescribed LR-3320 resin and 2.36 grams of an epichlorohydrin-bisphenol-A type epoxy resin. The resulting mixture is stirred until all of the organopolysiloxane-polycarbonate block copolymer, specifically General Electric LR-3320, is dissolved in the methylene chloride. This mixture is then applied onto a primed glass panel prepared substantially in accordance with Example 1. The primed glass panel coated with this second primer mixture is then air dried for 30 minutes and then heated at 100° C. for 1 hour. A 45 mil thick sheet of organopolysiloxane-polycarbonate block copolymer, specifically General Electric LR-3320, is placed on the dried primed glass surface. The laid-up structure is placed in a hydraulic press at 150° F. with the pressure being raised after entry of 200 psi. The press is then heated to 293° F. and held for 10 to 15 minutes. The heat source is then turned off and the laminate is cooled to room temperature and removed from the press.

EXAMPLE 3

A laminate is prepared substantially in accordance with the procedure of Example 2 except that the mixture contains 7.08 grams of epichlorohydrin-bisphenol-A type epoxy resin.

EXAMPLE 4

A laminate is prepared substantially in accordance with the procedure of Example 2 except that the mixture contains 11.8 grams of epichlorohydrin-bisphenol-A type epoxy resin.

EXAMPLE 5

A laminate is prepared substantially in accordance with the procedure of Example 2 except that the mixture contains 14.16 grams of epichlorohydrin-bisphenol-A type epoxy resin.

EXAMPLE 6

A laminate is prepared substantially in accordance with the procedure of Example 2 except that the mixture contains 23.6 grams of epichlorohydrin-bisphenol-A type epoxy resin.

EXAMPLE 7

A laminate is prepared substantially in accordance with the procedure of Example 2 except that the mixture contains 47.2 grams of epichlorohydrin-bisphenol-A type epoxy resin.

EXAMPLE 8

A laminate is prepared substantially in accordance with the procedure of Example 2 except that the mixture contains no epoxy resin.

Each of the laminates prepared in accordance with Examples 2–8 is subjected to a peel test which is designed to measure the adhesion between a flexible substrate and a rigid substrate. A peel test value of at least 15 lbs./inch is acceptable. Strips of composite 1 inch wide are used.

One end of the composite sheet is held in a clamp and the whole strip is mounted on a peeling jig affixed to an Instron tensile testing machine. As the machine's crosshead moves, the clamp remains stationary, the substrate is peeled, the jig maintains the angle of the peeled sheet to the substrate at 90°, and the force to peel the substrate is recorded on a chart. The peel value is reported in pounds per inch width of the strip. The results of this test are set forth in Table I below.

TABLE I

| Example: | 8 | 2 | 3 | 4 | 5 | 6 | 7 |
|---|---|---|---|---|---|---|---|
| Wt. % epoxy resin in primer layer: | 0 | 1 | 3 | 5 | 6 | 10 | 20 |
| Average lb./inch range | 10-20 | 10-25 | 15-35 | 30-45 | 30-40 | 20-30 | 5-10 |

As can be seen from Table I, the adhesive bond between the organopolysiloxane-polycarbonate block copolymer and the twice primed glass substrate is stronger when the second primer layer contains between 1 and 10 percent epoxy resin as compared to the adhesive bond between the organopolysiloxane-polycarbonate block copolymer and the twice primed glass substrate wherein the second primer layer contains no epoxy resin. Table I further demonstrates that if the second primer layer contains too much epoxy resin, i.e., Example 7, the adhesive bond is weaker than that obtained when utilizing a second primer layer containing no epoxy resin. Thus, the amount of epoxy resin present in the second primer layer is critical.

Although the above examples are limited to only a few of the variables applicable to the compositions, methods and articles within the scope of the present invention, it should be understood that the scope of the present invention can be further appreciated by the description preceeding these examples. Accordingly, temperatures and pressures such as 100° C. to 200° C. and 15 to 200 psi can be used when contacting the polydiorganosiloxane-polycarbonate copolymer to the primed glass substrate. Those skilled in the art would also know that the composites of the present invention can be used as safety glass which is resistant to heavy blows and missiles without failure as by delamination or spalling of the structure.

What I claim as new and desired to secure by Letters Patent of the United States is:

1. A laminate of glass and polycarbonate resin comprising at least one polycarbonate resin lamina bonded to at least one glass lamina, the glass lamina which is bonded to the polycarbonate lamina being primed on the surface thereof adjacent to the polycarbonate lamina with two adhesion promoting primer layers consisting essentially of (i) a first primer layer disposed on said surface of said glass lamina and consisting essentially of the equilibrated reaction product of (a) water, (b) a $C_{(1-8)}$ alkanol, and (c) the reaction mixture of 1 to 3 moles of an aminoalkyl polyalkoxysilane per mole of diorganocarbonate, where there is employed in such equilibrated reaction product, on a volume basis, from 0.5 to 10 parts of (a), and from 0.5 to 100 parts of (c) per 100 parts of (b); and (ii) a second primer layer disposed on said first primer layer and consisting essentially of from about 1 to about 15 weight percent of an epoxy resin and from about 85 to about 99 weight percent of a polysiloxane-polycarbonate copolymer, said primed surface of said glass lamina being adhered to said polycarbonate resin lamina by means of an adhesive interlayer of a polysiloxane-polycarbonate copolymer.

2. The laminate according to claim 1 wherein said polysiloxane-polycarbonate copolymer is prepared by reacting (a) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (b) a dihdyric phenol having the formula

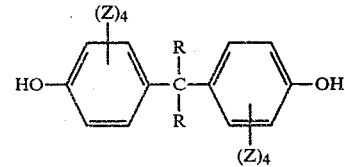

where Z is a member selected from the class consisting of hydrogen, lower alkyl radials and halogen radicals and combinations thereof, and R is a member selected from the class consisting of hydrogen, hydrocarbon and halogenated hydrocarbon radicals, and phosgenating the purified reaction product until the resulting copolymer achieves a maximum intrinsic viscosity.

3. The laminate according to claim 2 wherein the aminoalkyl polyalkoxysilane is gamma-aminopropyl triethoxysilane.

4. The laminate according to claim 3 wherein said $C_{(1-8)}$ alkanol is methyl alcohol.

5. The laminate according to claim 4 wherein said dialkylcarbonate is dimethylcarbonate.

6. The laminate according to claim 2 wherein said epoxy resin is the reaction product of 2,2′-bis(4-hydroxyphenyl)propane and epichlorohydrin.

7. The laminate according to claim 2 consisting of one lamina of said primed glass bonded to one lamina of said polycarbonate lamina by said adhesive polysiloxane-polycarbonate copolymer interlayer.

8. The laminate according to claim 7 wherein the exposed surface of the polycarbonate resin lamina has a mar-resistant coating thereon.

9. The laminate according to claim 2 consisting of two exterior primed glass lamina bonded to cored polycarbonate resin lamina by said adhesive polysiloxane-polycarbonate copolymer interlayers.

10. A method for making a multi-ply composite which comprises heating to an elevated temperature an assembly comprising a glass ply, a polycarbonate resin ply, and a polysiloxane-polycarbonate copolymer adhesive interlayer disposed between said glass ply and said polycarbonate resin ply, while subjecting such assembly to a pressure of at least about one atmosphere, where the glass ply has been primed on the surface thereof adjacent said interlayer with two primer layers consisting essentially of (i) a first primer layer disposed on said glass consisting essentially of the equilibrated reaction product of (a) water, (b) a $C_{(1-8)}$ alkanol, and (c) the reaction mixture at temperatures in the range of between about 0° C. to about 90° C. of 1 to 3 moles of an aminolkyl polyalkoxysilane per mole of a diorganocarbonate, where there is employed in such equilibrated reaction product, on a volume basis, from 0.5 to 10 parts of (a), and from 0.5 to 10 parts of (c) per 100 parts of (b); and (ii) a second primer layer disposed on said first primer layer consisting essentially of from about 1 to about 15 weight percent of an epoxy resin and from about 85 to about 99 weight percent of a polysiloxane-polycarbonate copolymer.

11. A method for making a three-ply composite in accordance with claim 10 consisting of one primed glass ply, a polycarbonate resin ply, and an adhesive polysiloxane-polycarbonate copolymer interlayer.

12. A method for making a five-ply composite in accordance with claim 10 consisting of two exterior primed glass plies, two interior polysiloxane-polycarbonate copolymer plies, and a core polycarboate resin ply in contact with said polysiloxane-polycarbonate plies.

* * * * *